US012783284B2

(12) United States Patent
Borisov et al.

(10) Patent No.: US 12,783,284 B2
(45) Date of Patent: Nov. 3, 2026

(54) IGNORE INACCESSIBLE VOLUMES FOR SOFTWARE DEFINED STORAGE DEPLOYED IN CONTAINER ORCHESTRATOR SYSTEMS

(71) Applicant: Dell Products L.P., Round Rock, TX (US)

(72) Inventors: Mikhail Borisov, Dublin (IE); Danil Safronov, Warsaw (PL)

(73) Assignee: DELL PRODUCTS L.P., Round Rock, TX (US)

( * ) Notice: Subject to any disclaimer, the term of this patent is extended or adjusted under 35 U.S.C. 154(b) by 359 days.

(21) Appl. No.: 18/643,508

(22) Filed: Apr. 23, 2024

(65) Prior Publication Data

US 2025/0328371 A1 Oct. 23, 2025

(51) Int. Cl.
*G06F 9/45* (2006.01)
*G06F 9/455* (2018.01)

(52) U.S. Cl.
CPC .................... *G06F 9/45558* (2013.01); *G06F 2009/45583* (2013.01)

(58) Field of Classification Search
CPC .. G06F 12/08; G06F 12/0862; G06F 12/0875; G06F 12/0895; G06F 15/17381; G06F 2115/10; G06F 2212/455; G06F 2212/6026; G06F 30/323; G06F 30/392; G06F 30/30; G06F 8/40; G06F 8/4452; G06F 8/452; G06F 9/52; G06F 9/546; H04L 67/56; H04L 67/568; H04L 67/562
See application file for complete search history.

(56) References Cited

U.S. PATENT DOCUMENTS

2013/0125097 A1* 5/2013 Ebcioglu ............... G06F 8/4452 717/136
2020/0351370 A1* 11/2020 Radi ................... G06F 12/0828

FOREIGN PATENT DOCUMENTS

EP 0458567 A2 * 11/1991 ........... G06F 3/0664

OTHER PUBLICATIONS

Unknown "Proposal: Fake Attach Volume" Github, https://github.com/dell/csi-baremetal/blob/master/docs/fake-attach.md, Last Accessed Apr. 11, 2024, 3 pages.

(Continued)

*Primary Examiner* — Craig C Dorais
(74) *Attorney, Agent, or Firm* — Amin, Turocy & Watson, LLP

(57) ABSTRACT

A facility to ignore inaccessible volumes for software defined storage deployed in container orchestrator systems is presented herein. An example method comprises, in response to receiving error message data representative of an inaccessibility of a volume of a group of volumes being used by a container in execution on application server equipment, sending indicator data to an agent process that is monitoring execution of the container, wherein the indicator data represents a first command of a collection of commands that orders the agent process to desist from mounting the volume of the group of volumes to an accessible global space, and based on a second command, mounting a partial group of volumes to the accessible global space, wherein the partial group of volumes excludes the volume that is inaccessible, and notifying the agent process that the partial group of volumes is available in the accessible global space.

20 Claims, 12 Drawing Sheets

(56) References Cited

OTHER PUBLICATIONS

Unknown "kubernetes-sigs/vsphere-csi-driver" Github, https://github.com/kubernetes-sigs/vsphere-csi-driver, Last Accessed Apr. 11, 2024, 3 pages.
Unknown "Volume Health Monitoring Feature" Kubernetes CSI Developer Documentation, https://kubernetes-csi.github.io/docs/volume-health-monitor.html, Last Accessed Apr. 11, 2024, 2 pages.
Unknown "What is container orchestration?" Google Cloud, https://cloud.google.com/discover/what-is-container-orchestration#:~:text=Container%20orchestration%20automatically%20provisions%2C%20deploys,life%20cycle%20management%20of%20containers, Last Accessed Apr. 11, 2024, 8 pages.
Unknown "Stateful vs stateless" Red Hat, https://www.redhat.com/en/topics/cloud-native-apps/stateful-vs-stateless#:~:text=The%20key%20difference%20between%20stateful,as%20an%20independent%2C%20isolated%20transaction, Last Accessed Apr. 11, 2024, 7 pages.
Unknown "Volumes" Docker.docs, https://docs.docker.com/storage/volumes/, Last Accessed Apr. 11, 2024, 18 pages.
Unknown "kubernetes-client/python" Github, https://github.com/kubernetes-client/python/blob/master/kubernetes/docs/V1PersistentVolumeClaimVolumeSource.md, Last Accessed Apr. 11, 2024, 2 pages.
Unknown "container-storage-interface/spec" Github, https://github.com/container-storage-interface/spec/blob/master/spec.md#volume-lifecycle, Last Accessed Apr. 11, 2024, 102 pages.
Unknown "kubelet" kubernetes, https://kubernetes.io/docs/reference/command-line-tools-reference/kubelet/, Last Accessed Apr. 11, 2024, 16 pages.
Unknown "Volume Health Monitoring" kubernetes, https://kubernetes.io/docs/concepts/storage/volume-health-monitoring/, Last Accessed Apr. 11, 2024, 1 page.

* cited by examiner

600

```yaml
apiVersion: apps/v1
kind: Deployment
metadata:
  name: my-deployment
  labels:
    app: myapp
spec:
…
    spec:
…
      volumes:
      - name: my-content
        persistentVolumeClaim:
          claimName: myclaim
          ignoreMountError: Publish
```

602

FIG. 6

700

```
apiVersion: apps/v1
kind: Deployment
metadata:
  name: my-deployment2
  labels:
    app: myapp2
spec:
...
    spec:
...
      volumes:
      - name: my-content
        persistentVolumeClaim:
          claimName: myclaim
          ignoreMountError: None
```

702

FIG. 7

IGNORE INACCESSIBLE VOLUMES FOR SOFTWARE DEFINED STORAGE DEPLOYED IN CONTAINER ORCHESTRATOR SYSTEMS

BACKGROUND

Containerized orchestrator systems, such as Kubernetes, can automatically provision, deploy, scale, and manage containerized applications without regard to the underlying hardware infrastructure. Container orchestration can be implemented anywhere containers are situated. Using container orchestration systems typically can automate the lifecycle management of containers.

Containers typically are self-contained software packages that can comprise all of the required elements to effectuate execution of the containerized software in any operating system. Thus, containerized software generally is operating system agnostic and/or usually independent of both the underlying operating system and/or the underlying hardware on which the containerized software is executed. Containers can internally virtualize the operating system, and therefore can execute anywhere from private data centers to publicly available cloud infrastructures, and/or to a developer's personal laptop. Containers are therefore lightweight packages of application code together with dependencies, such as specific versions of programming language, runtimes, and libraries required to execute software services. Containers being self-contained make it simpler to share processing, memory, storage, and network resources at the operating systems level, and offer a logical packaging mechanism in which applications can be abstracted from the environment in which they actually run.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 6 depicts an example configuration for implementing the functionality for ignoring inaccessible volumes for software defined storage deployed in container orchestrator systems, in accordance with various non-limiting example embodiments.

FIG. 7 depicts another example configuration for implementing the functionality for ignoring inaccessible volumes for software defined storage deployed in container orchestrator systems, in accordance with various non-limiting example embodiments.

DETAILED DESCRIPTION

Figure 1:
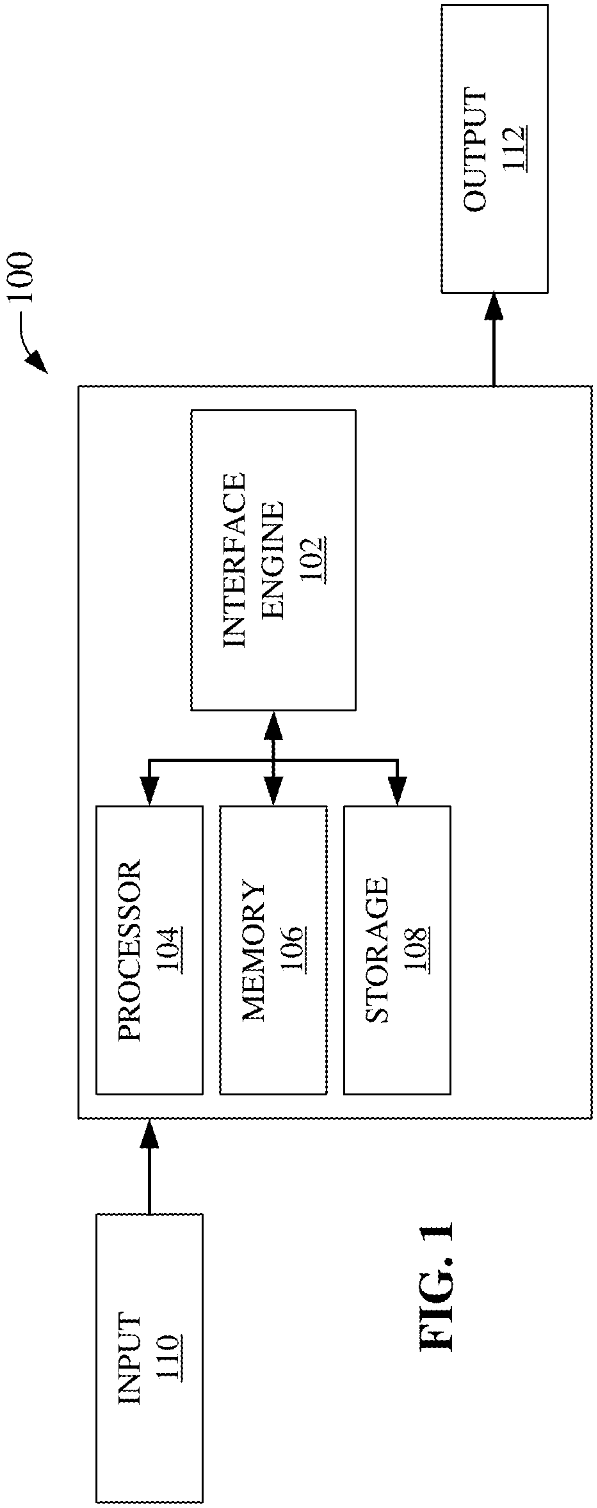
FIG. 1 illustrates a block diagram of a system for ignoring inaccessible volumes for software defined storage deployed in container orchestrator systems, in accordance with various non-limiting example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

The disclosed subject matter in general relates to systems and/or methods for ignoring inaccessible volumes for software defined storage deployed in container orchestrator systems.

The disclosed systems and methods, in accordance with various embodiments, provide a system, apparatus, or device comprising: a processor; and a memory that stores executable instructions that, when executed by the processor, facilitate performance of operations. The operations can comprise: receiving, from an agent process associated with a container being executed by the at least one processor, error message data representative of an unavailability of a volume of a group of volumes to be accessible to a global space that is sharable by a pod of pods. Further, in response to the error message data, sending, to the agent process, indicator data representing a first instruction of a group of instructions, as a result of which the agent process ceases attempting to mount the volume of the group of volumes to the global space. Additionally, a second instruction of the group of instructions can be used, to mount a partial group of volumes to the global space, wherein the partial group of volumes excludes the volume that is unavailable.

In regard to the foregoing, the pod of pods can comprise a group of containers that share the global space. The container can represent a self-sufficient, self-contained software package comprising executable software application code, executable runtime environment and associated system tools, system libraries, and parameters used to execute the executable software application code, wherein the container can be independently operable in diverse and multiple operating system environments and is executable on disparate computing hardware other than the system. In some embodiments the container can virtualize a first operating system in order to execute an application instance independently of a second operating system operating on computing hardware. When the first instruction is sent to the agent process, the agent process causes a failure of the group of volumes to be mounted to the global space. When the second instruction is sent to the agent process, the agent process can permit or allow the partial group of volumes to be mounted to the global space and be accessible to the pod of pods. When a third instruction is sent to the agent process, the agent process can cause the partial group of volumes to be mounted to a directory accessible to the container.

In accordance with further embodiments, the subject disclosure describes a method, comprising a sequence of acts that can include: in response to receiving, by storage server equipment comprising one or more processors, error message data representative of an unavailability of a volume of a group of volumes being used by a container in execution via application server equipment, sending indicator data to an agent process that is monitoring execution of the container via the application server equipment, wherein the indicator data represents a first actionable prompt of a collection of application prompts, and wherein in response to receiving the actionable prompt the agent process omits mounting of the volume of the group of volumes to an accessible global space, based on a second actionable prompt, mounting, by the storage server equipment, a partial group of volumes to the accessible global space, wherein the partial group of volumes excludes the volume that is unavailable, and notifying the agent process that the partial group of volumes is available in the accessible global space.

The accessible global space in some embodiments can be shared by a pod of a grouping of pods, wherein each pod can comprise groups of disparate containers, and wherein the container can be included in the pod of pods. Further, the storage server equipment can operate using object storage software that can be a virtualization that separates physical storage hardware from the object storage software that manages the physical storage hardware. The container can be a self-contained software bundle comprising machine executable application programming instructions, an executable runtime operating system environment, applicable software tools, software libraries, and runtime parameters necessary for execution of the machine executable application programming instructions. The indicator data can represent a default instruction, and wherein, responsive to the unavailability of the volume and execution of the default instruction, the group of volumes can be made to be inaccessible in the accessible global space. Additionally, in some embodiments, the indicator data can, for instance, represent a bind mount instruction, wherein, responsive to the unavailability of the volume and execution of the bind mount instruction, the partial group of volumes can be permitted to be accessible in the accessible global space. Also, the indicator data can represent a file system mount instruction, and wherein, responsive to the unavailability of the volume and execution of the file system mount instruction, the partial group of volumes can be made to be associated with a directory accessible to a pod comprising the container. It should be noted that container storage interfaces can perform a multitude of disparate mount operations in response to diverse instruction data; bind mount instructions and file system mount instructions are disclosed for ease of exposition and purposes of illustration rather than limitation.

In accordance with still further embodiments, the subject disclosure describes a machine-readable storage medium, a computer readable storage device, or non-transitory machine-readable media comprising instructions that, in response to execution, cause a computing system comprising at least one processor to perform operations. The operations can comprise: in response to receiving error message data representative of an inaccessibility of a volume of a group of volumes being used by a container in execution on application server equipment, sending indicator data to an agent process that can be monitoring execution of the container on the application server equipment, wherein the indicator data can represent a first command of a collection of commands that orders the agent process to desist from mounting the volume of the group of volumes to an accessible global space, based on a second command of the collection of commands, mounting a partial group of volumes to the accessible global space, wherein the partial group of volumes excludes the volume that has been deemed as being inaccessible, and notifying the agent process that the partial group of volumes is available in the accessible global space.

The container can be a software collection comprising executable application programming instructions, an executable runtime operating system environment within which the executable programming instructions can be executed, applicable software tools, software libraries, and runtime parameters required for the execution of the executable application programming instructions and the executable operating system environment. The indicator data can represent the first command that, in response to execution of the first command, the agent process based on the unavailability of the volume, can cause the group of volumes to be made inaccessible in the accessible global space. In some instances, the indicator data can represent the second command that, in response to execution of the second command, the agent process based on the unavailability of the volume, can permit the partial group of volumes to become accessible in the accessible global space. In further instances, the indicator data can represent a third command that, in response to the third command being executed, the agent process based on the unavailability of the volume, can cause the partial group of volumes to be associated with a directory accessible to the container included in a pod of pods.

Software defined storage (SDS) can be computer data storage software for provisioning and/or management of data storage independent of underlying hardware; can be in the form of storage virtualization that separates the physical storage hardware from the software that manages it; and/or can store data (e.g., user data and/or metadata) across multiple persistent volumes on disparate geographically distributed and dispersed storage equipment. Generally, on the disparate distributed storage equipment, such as storage server equipment, and the like, multiple disks and/or multiple memory locations (e.g., persistent volumes) can be mounted to a single pod, wherein a pod can be a group of containers, with a group of shared resources (e.g., storage, processor and network resources), and a specification for how to execute the containers in the pod. In this regard, a pod's contents are generally co-located and co-scheduled, and typically can be executed in a shared context. Where multiple or groups of disks and/or memory locations (e.g., persistent volumes) are mounted to a single pod, a single disk and/or memory location failure of the groups of disks can cause data unavailability of the remaining healthy disks and/or healthy memory locations in the groups of disks and/or memory locations.

Container engines, such as Docker™, and the like, are collections of platform as a service (PaaS) products that generally use operating system level virtualization to deliver executable software in containers. Container engines typically can be used to automate the deployment of applications in lightweight containers so that the executable applications within the containers can execute efficiently in different environments (e.g., operating system, programming language, software execution, and/or hardware) in isolation. Container engines generally provide facilities and/or functionalities for persisting data generated by and/or used by containers. Container orchestration systems can place heavy reliance on application programming interfaces (APIs) to deploy and manage stateful applications-applications and/or processes that allow users to store, record, and/or return to already established information and processes over the internet, for example.

The use of container engines can impose constraints in that application instances (e.g., containers) and persistent volumes comprising multiple disks can be tightly coupled. As a consequence of this tight coupling there can be instances where containers (and their included executable application payload) cannot be executed when a single persistent volume of a grouping of persistent volumes becomes inaccessible, for example, due to file system corruption relating to a single persistent volume comprising the grouping of persistent volumes. Other causes of persistent volume inaccessibility can include situations where a volume of the grouping of persistent volumes starts to become unstable (e.g., unhealthy), and/or where one or more physical disk and/or physical memory location associated with the grouping of persistent volumes fails or has become corrupt.

For storage systems that operate using object storage software (e.g., software defined storage) paradigms, and in accordance with several principles of object storage, such as scalability, data resilience, and/or cost efficiency, multiple volumes can be attached to specific containers and/or particular applications (e.g., the specific containers and/or particular applications can be closely associated with multiple volumes of a defined storage server), wherein due to performance and optimal resource usage reasons are able to temporarily and/or permanently handle the unavailability and/or inaccessibility of some, or substantially all, of the volumes of the multiple volumes.

Figure 2:
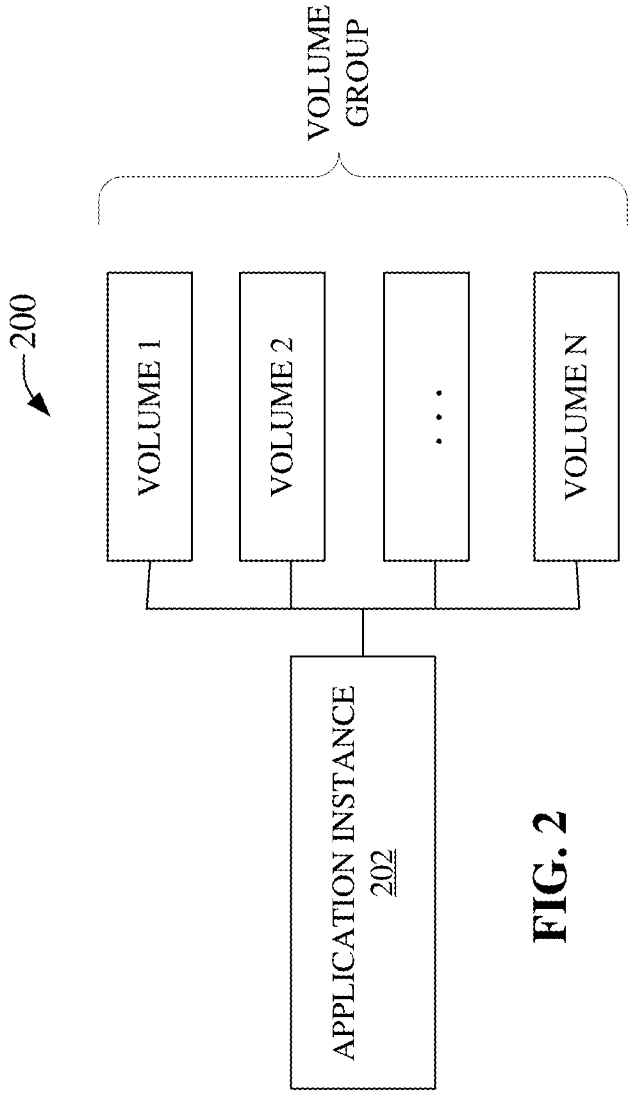
FIG. 2 depicts an example application instance and associated group of volumes, in accordance with various non-limiting example embodiments.

With reference to FIG. 2 a depiction of an example container 200 is presented. Container 200 in this example, illustrates that application instance 202 is coupled to a group of volumes labeled volume 1, volume 2, . . . , volume N, wherein N is an integer value greater than zero (0). Application instance 202, in accordance with various embodiments, can be reliant on volume 1, volume 2, . . . , volume N for execution of application instance 202. In this regard application instance 202 can be said to be tied to the defined group of volumes and should one or more of the group of volumes fail, is inaccessible, or becomes inaccessible, application instance 202 typically can fail to execute.

Figure 3:
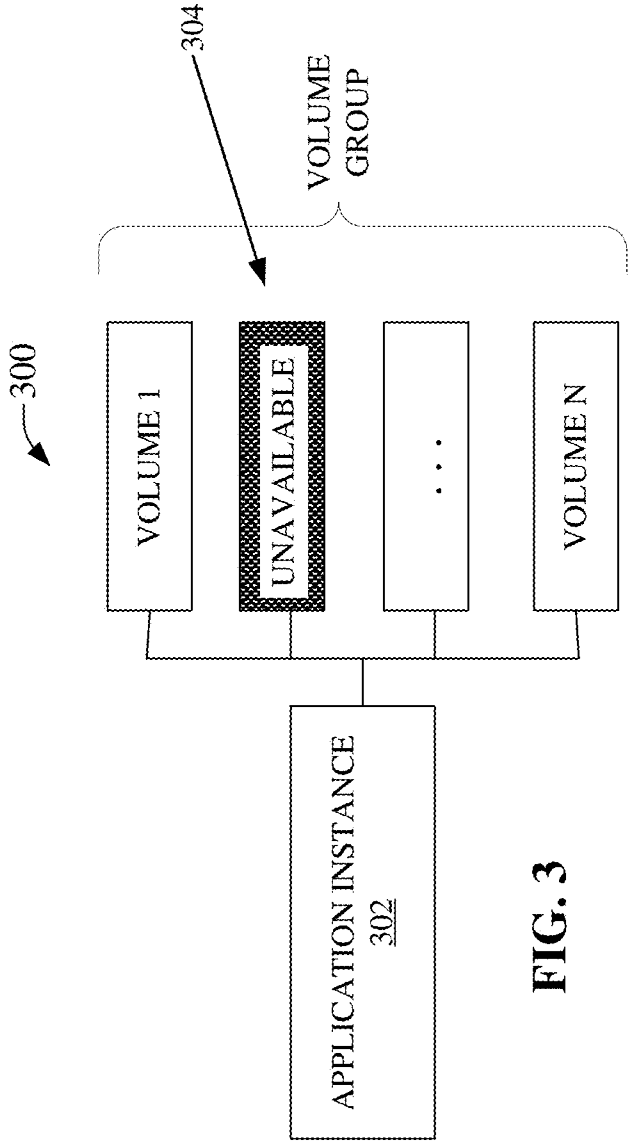
FIG. 3 illustrates another application instance and associated group of volumes wherein one volume has become inaccessible, in accordance with various non-limiting example embodiments.

In regard to FIG. 3 that depicts the example container 200 (now labeled as container 300) and application instance 202 (now labeled as application instance 302), wherein volume 2 (item 304) of the group of volumes has become inaccessible and/or has failed because, for example, the data persisted to volume 2 (item 304) has become corrupt. Here, when such a situation occurs (e.g., a volume of the group of volumes has become inaccessible for one of various reasons), execution of the content of container 300, and more particularly, execution of application instance 302, typically can fail because the entirety of the group of volumes will now be deemed to be inaccessible despite the fact that only one of the group of volumes has become inaccessible. More succinctly the failure of one volume of the group of volumes can cause a failure in the entirety of the group of volumes, and as such the group of volumes, as a whole, becomes inaccessible, and consequently execution of application instance 302 ceases to execute.

Once application instance 302 becomes inoperative, one or more attempts to re-execute application instance 302 will undoubtedly be performed, but because one of the group of volumes is offline or unavailable, these attempts will meet with failure. In order to address this situation, the disclosed subject matter proposes to add a functionality to the specification of container orchestration systems, such as Kubernetes. More particularly, the new functionality can be added to the specification for a wrapper (e.g., PersistentVolumeClaimVolumeSource) that surrounds volumes that can, for example, be owned by storage system equipment. The new functionality to be added to the specification of the container orchestration system can be referred to as an ignoreMountError functionality, wherein the ignoreMountError functionality can use a group of state operators comprising, for example: "None," "Stage (bind mount)," and "Publish (file system (FS) mount)." The state operator "None" can be representative of a default behavior—where the new ignoreMountError functionality is generally not to be used; the state value "Stage (bind mount)" can represent that a volume grouping is mounted to a global space, and that the volume grouping can be shared across multiple pods (e.g., a group of containers with access, during execution, to a group of shared resources, and a specification for how to execute each of the containers); and the state value "Publish (FS mount)" can be an indication that the grouping of volumes is mounted to a directory of a pod of the multiple pods. (e.g., the grouping of volumes associated with a container of the group of containers has been mounted to a directory of the container).

Figure 5:
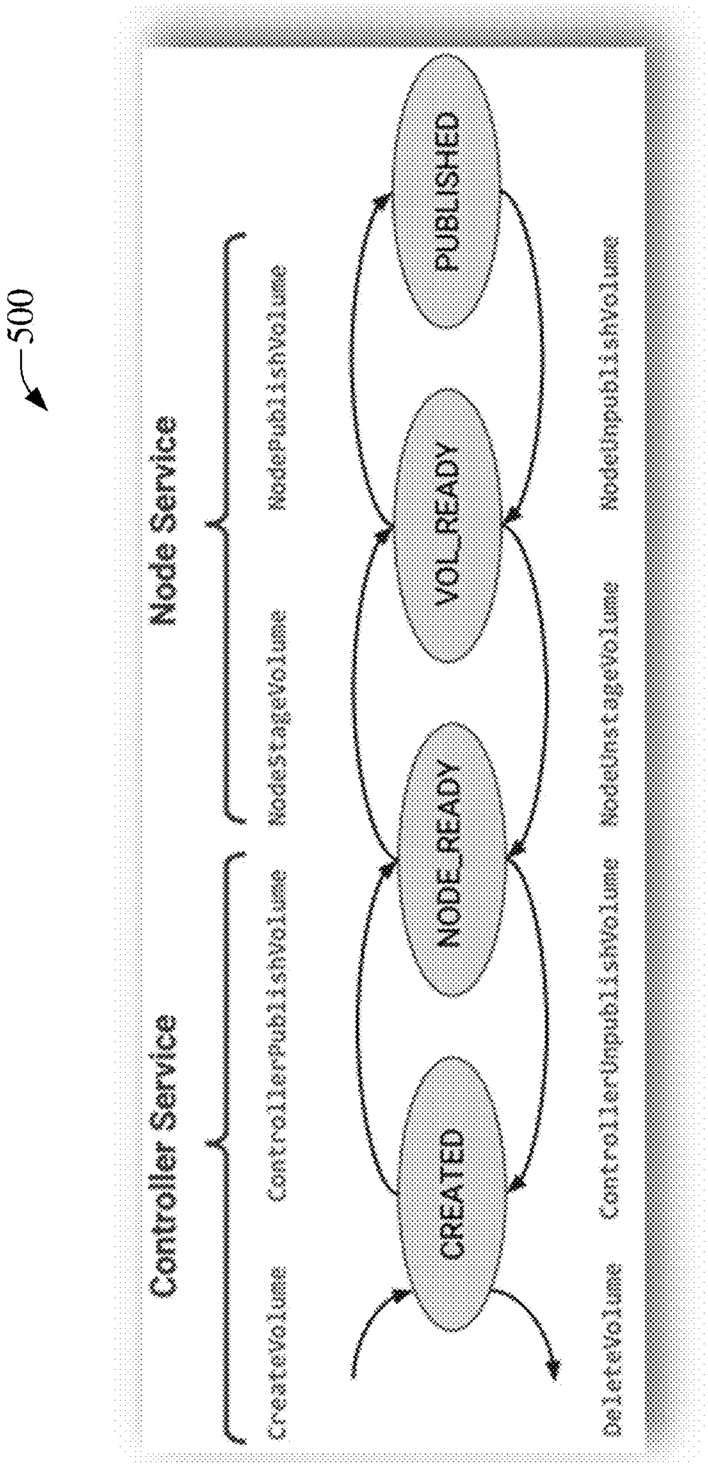
FIG. 5 illustrates a mount flow chart comprising a one or more states, in accordance with various non-limiting example embodiments.

It should be noted that the group of state operators comprising "None," "Stage (bind mount)," and "Publish (FS mount)" are additive to other existing state operators associated with the container storage interface (CSI), such as "CREATE," "NODE_READY," "VOL_READY," and "PUBLISHED." These existing state operators are depicted in the mount flow diagram FIG. 5. Additionally, as illustrated in FIG. 5, are a collection of transition directives comprising executable programming code segments that, via the executable programming code segments being executed by a processor associated with the CSI, can initiate transitions from a first transition value to a second transition value. The transition directives can include the following executable programming code segments: "Create Volume," "ControllerPublishedVolume," "NodeStageVolume," "NodePublishVolume, "NodeUnpublishVolume," "NodeUnstageVolume," "ControllerUnpublishVolume," and "DeleteVolume." For instance, a transition from the "NODE_READY" value to the "VOL_READY" value can be effectuated through use of executable code segment "NodeStageVolume." Similarly, a transition from the "PUBLISHED" value to the "VOL_READY" value can be accomplished by executing the code segment "NodeUnpublishVolume." It will also be observed in relation to FIG. 5 that transition directives "Create Volume," "ControllerPublishedVolume," "ControllerUnpublishVolume," and "Delete Volume," can be associated with a "Controller Service," and transition directives "NodeStageVolume," "NodePublishVolume, "NodeUnpublishVolume," and "NodeUnstageVolume," can be associated with a "Node Service." The "Controller Service" is generally responsible for handling application programming interface (API) calls for creating, expanding, and deleting one or more volumes of the group of volumes, whereas the "Node Service" can be a service executing and/or operable on a node of a collection of nodes.

Concerning nodes of collections of nodes these can be maintained in concert with SDS—computer data storage software for provisioning and/or management of data storage independent of underlying hardware. SDS can be in the form of storage virtualization that separates the physical storage hardware from the software that manages it. Further, SDS can store data (e.g., user data and/or metadata) across multiple persistent volumes on disparate geographically distributed and dispersed storage equipment. Generally, as noted earlier, on the disparate distributed storage equipment, such as storage server equipment, and the like, multiple disks and/or multiple memory locations (e.g., persistent volumes) can be mounted to a single pod, wherein a pod can be a group of containers, with a group of shared resources (e.g., storage, processor and network resources), and a specification for how to execute the containers in the pod. A pod's contents are generally co-located and co-scheduled, and typically can be executed in a shared context. Where multiple or groups of disks and/or memory locations (e.g., persistent volumes) are mounted to a single pod, a single disk and/or memory location, failure of the groups of disks can cause data unavailability of the remaining healthy disks and/or healthy memory locations in the groups of disks and/or memory locations.

When executable code associated with the NodeStageVolume transition directive fails to bind mount (e.g., bind mount-mount a path to a different path, rather than mounting a device to the path) a volume of the collection of volumes, this failure can be due to the volume not being present (e.g., one or more disks or memory locations associated with the volume can be offline, and/or the one or more disks or memory locations can have been removed from the collection of volumes). Consequently, when there is a failure to transition at the NodeStageVolume stage, subsequent transitions, for example, to the NodePublishVolume stage can fail. In response to the failure to transition from a NodeStageVolume state to a NodePublishVolume state, in some embodiments, can be attributed to file system corruption, for instance. In this context it can therefore be useful for a user identity (e.g., application programmer identity) while they are coding the containerized executable application to select and/or identify which type of mount error is safe to ignore for defined application instances.

FIG. 6 depicts an example configuration representative of PersistentVolumeClaimVolumeSource that includes the new functionality "ignoreMountError," is labeled 602. When an agent process (e.g., a kubelet) operational on a node device of a group of node devices (e.g., API server equipment) receives a mount error from the CSI, via a CSI driver process executing and associated with the CSI, and the ignoreMountError functionality is set to None, the agent process, in response to noting the failure, removes the failed volume from the grouping of persistent volumes. Removal of the failed volume, as has been observed earlier, can cause the entirety of the grouping of persistent volumes to be accessible to the pod of containers. Concerning a kubelet these can be agent processes in execution on each node of the group of nodes, registering the node with an application programming interface server (e.g., API server equipment) using one of: a hostname; a flag to override the hostname; or specific logic for a defined cloud provider. A failure of the entirety of the grouping of volumes to mount properly, in turn can lead to the agent processes cycling between the NodeStageVolume and the NodePublishVolume transition directives. To avoid the cycling of the agent processes, where a failure to mount the entirety of the group of volumes is due to a failure to mount at least one or more volume of the grouping of volumes, a containerized application instance executing on the API server equipment should be able to check whether the one or more volume of the grouping of volumes is actually present when the containerized application instance is initiated.

Accordingly, the CSI can provide an option to inform the agent process executing on a node device of a group of node devices (e.g., API server equipment), that the ignoreMountError facility provides functionalities associated with checking whether the one or more volume of the grouping of volumes is present when the application instances commence execution. In order to expose the ignoreMountError functionalities and/or facilities, the CSI can return a special error code that distinguishes mount errors from other errors. Without the CSI exposing the ignoreMountError capabilities, facilities, and/or functionalities, the agent process in execution on API server equipment can skip using the ignoreMountError features. It has been observed that where the issue is not related to mounting one or more volume of the group of volumes, the agent process in execution, on a node device of a group of node devices, will generally continue to cycle between the NodeStageVolume and the NodePublishVolume transition directives.

In instances where there are multiple pods sharing a persistent volume and one pod of the multiple pod requests that the persistent volume be mounted, but the persistent volume of the group of persistent volumes is nevertheless inaccessible, the following example configuration, also configured via PersistentVolumeClaimVolumeSource and illustrated in FIG. 7, can be used to facilitate the sharing of the persistent volume of the group of persistent volumes. It will be observed that the ignoreMountError functionality is labeled 702.

In order to recover when an omitted volume of a group of volumes subsequently becomes available and/or accessible, a volume heath monitoring functionality can be used to recover a previously inaccessible volume. The volume health monitoring functionality and/or facility can detect whether or not one or more abnormal volume conditions or rectification to the abnormal volume conditions have occurred in connection with a volume of the group of volumes. In response to determining that an abnormality condition associated with the volume of the group of volumes has been remedied, the abnormal conditions associated with the unavailable/inaccessible volume of the group of volumes can be cleared. Further, once the abnormal conditions associated with previously unavailable/inaccessible volume has been cleared, an event for a pod that includes the container that initially required access to the unavailable/inaccessible volume can be generated. Once the event representing the fact that a previously unavailable/inaccessible volume of the group of volumes has now become available, the pod comprising at least the container that necessitated a determination that the volume of the group of volumes had become inaccessible and/or unavailable, can be restarted, and the priorly inaccessible and/or unavailable volume of the group of volumes can rejoin the group of volumes to which it was associated and made accessible once again to the container that needed access to the volume of the group of volumes. In this regard it should be observed that once the volume of the group of volumes has been rendered operable and accessible once again, the pod of pods, to which the container is affiliated, can also access the previously inaccessible and/or unavailable volume of the group of volumes.

Now in reference to FIG. 1 that depicts a system 100 for ignoring inaccessible volumes for software defined storage deployed in container orchestrator systems, in accordance with various example embodiments. System 100, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 100 can include tablet computing devices, handheld devices, server class computing equipment, machines, and/or database equipment, laptop computers, notebook computers, desktop computers, cell phones, smart phones, consumer appliances and/or instrumentation, industrial devices and/or components, hand-held devices, personal digital assistants, multimedia Internet enabled phones, Internet of Things (IoT) equipment, multimedia players, and the like.

System 100 can comprise interface engine 102 that can be in operative communication with processor 104, memory 106, and storage 108. Interface engine 102 can be in communication with one or more processor 104 for facilitating operation of computer-executable instructions or machine-executable instructions and/or components by interface engine 102; at least one memory 106 for storing data and/or computer-executable instructions and/or machine-executable instructions and/or components; and one or more storage 108 for providing longer term storage of data and/or machine-readable instructions and/or computer-readable instructions. Additionally, system 100 can also receive input 110 for use, manipulation, and/or transformation by interface engine 102 to produce one or more useful, concrete, and tangible results, and/or transform one or more articles to different states or things. Further, system 100 can also generate and output the useful, concrete, and tangible result and/or the transformed one or more articles as output 112.

Figure 4:
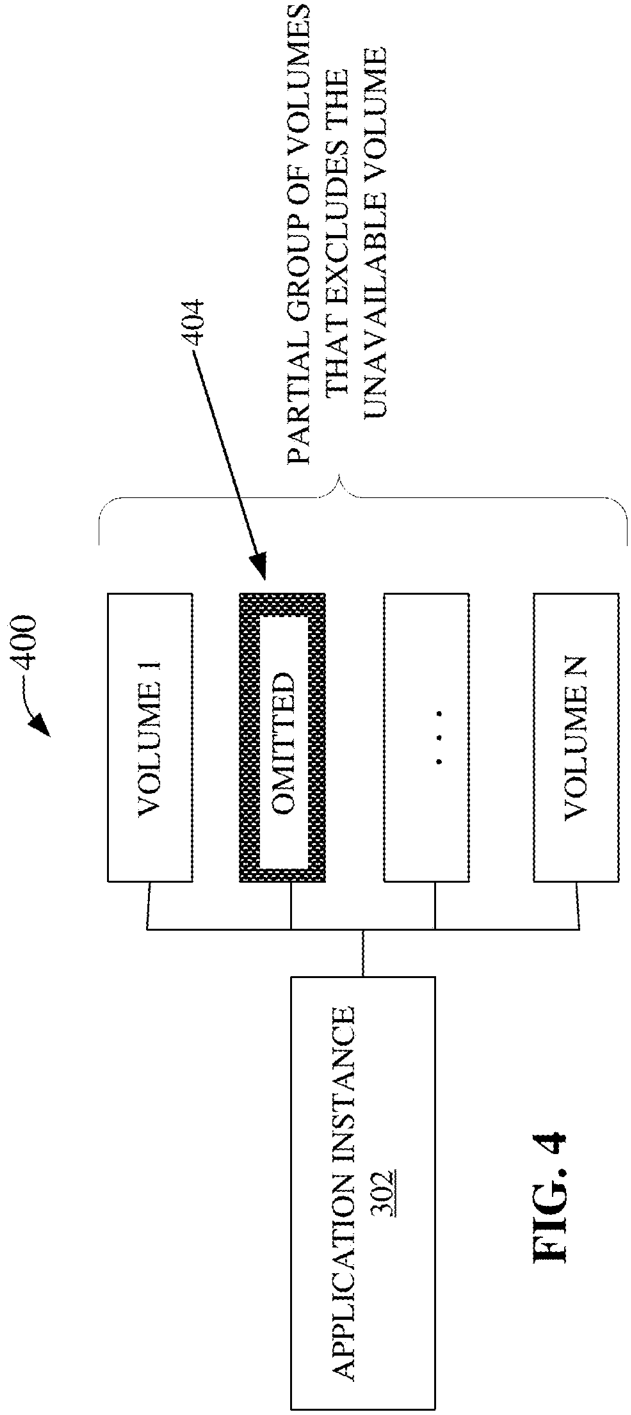
FIG. 4 illustrates a further application instance and associated partial group of volumes that omits one volume that has been deemed inaccessible, in accordance with various non-limiting example embodiments.

System 100 in conjunction with interface engine 102 in some embodiments can receive, as input 110, error message data that can indicate that a volume of a group of volumes has become inaccessible to a global space that can be sharable by a pod of a grouping of pods. The error message data can be received from an agent process that can be associated with a container that can be in execution on at least processor associated with API server equipment, for example. Interface engine 102 in response to receiving the error message data can transmit to the executing agent process indicator data representing an instruction of a group of instructions, as a result of which, the executing agent process, or the associated container, to cease attempting to mount the inaccessible volume of the group of volumes to the global space. Thereafter interface engine 102 can use the indicator data to instruct the agent process to mount a partial group of volumes (see FIG. 4) to the global space, wherein the partial group of volumes does not include the inaccessible volume (see item 404 in FIG. 4) that has been indicated as being unavailable.

The pod of the grouping of pods can comprise the container that is in execution on the application server equipment, and the partial group of volumes exclusive of the unavailable and/or inaccessible volume can be made available to both the container in execution on the application server equipment as well as the grouping of pods to which the container in execution is associated, as well as any other executing and contingent containers included in the pod and/or further executing containers included in the grouping of pods. As has been noted earlier, the container in execution can be a self-sufficient, self-contained software package that can comprise executable software application code, an executable runtime environment and associated system tools, system libraries, and parameters necessary for execution of the executable software application code in the runtime environment. Moreover, the container in execution as well as the included executable software application can be independently operable in diverse and multiple operating system environments and/or can be executable on disparate computing hardware other than system 100. Additionally, the container, when in execution, virtualizes a first operating system in order to execute an application instance independently of a second operating system that can be operational on underlying computer hardware.

The indicator data in some embodiments can represent a first instruction, wherein in response to sending the first instruction to the agent process operational on API server equipment, the executing agent process (and/or the associated container) can cause the group of volumes not to be mount to the global space, and consequently the group of volumes as a whole, can be rendered unavailable for access to both the executing container (for which the executing agent process is responsible) as well as the pod in which the container is a member, and the group of pods to which the pod belongs. It should be observed that there can be multiple executing agent processes responsible for individual containers that are in contemporaneous execution. For instance, a first agent process can be responsible for a first container that can be in execution, and/or a second agent process can be responsible for the execution of a second container that is contemporaneously in execution with the first container, wherein the first container and the second container belong to the same pod. Additionally and/or alternatively, a third agent process can be responsible for monitoring and the execution of a third container that is in simultaneous execution with the first container and the second container, wherein the third container is not a member of the pod that includes the first container and the second container, but rather the third container can a member of a distinct another pod that can be associated with the group of pods.

In some additional and/or alternative embodiments, the indicator data can represent a second instruction, wherein when the second instruction is conveyed to the agent process operational, for instance, on the API server equipment, the agent process in execution can permit the partial group of volumes to be mounted to the global space and to become accessible to the pod of pods.

In yet other additional and/or alternative embodiments, the indicator data can be representative of a third instruction, wherein when the third value is communicated to the agent process executing on the API server equipment, the executing agent process can mount the partial group of volumes to a directory that is accessible to the container.

In additional and/or alternative embodiments, system 100, in concert with interface engine 102 (and/or in collaboration with an executing agent process operational on API server equipment), in response to receiving, by storage server equipment, error message data representative of an inaccessibility or unavailability of a volume of a group of volumes being used by a container in execution using API server equipment, interface engine 102 can send indicator data to the agent process that is monitoring the execution of the container. The indicator data can be indicative of an actionable prompt of a collection of actionable prompts, wherein the actionable prompt on receipt by the agent process managing the execution and/or interactions of the container with system F!00 can facilitate the agent process (and/or the container associated with the agent process) to omit mounting, to an accessible global space, the volume of the group of volumes that has been noted, in the earlier received error message data, as being inaccessible and/or unavailable.

System 100 together with interface engine 102, based at least in part on the actionable prompt can thereafter cause, or facilitate, the agent process managing the executable container to mount a partial group of volumes to be available to the global space, wherein the partial group of volumes excludes the volume that was noted as being unavailable and/or inaccessible. Interface engine 102 together with the agent process can thereafter notify the container being controlled and/or monitored by the agent process that the partial group of volumes is available in the accessible global space.

In accordance with additional and/or alternative embodiments, the accessible global space can be shared by a pod of pods, wherein each pod can comprise groups of disparate containers in execution, and wherein the container in execution can be a member of the pod of pods.

The container can be a self-contained, self-sufficient bundle comprising machine executable application programming instructions, executable runtime operating system environments, applicable software tools, software libraries, and runtime parameters necessary to execution of the machine executable instructions in one or more of the executable runtime operating system environments.

In some instances, the indicator data can represent a default instruction that indicates to, and directs, the agent process to operate in a default manner (e.g., in response to receiving the default instruction the agent process is to ensure that the entirety of the group of volumes is inaccessible in the accessible global space). In additional and/or alternative instances, the indicator data can represent a bind mount instruction, wherein the agent process, responsive to the bind mount instructions operates to bind mount the partial group of volumes excluding the volume(s) that is indicated as being inaccessible and/or unavailable when the container associated with a pod of pods requested access to the volume(s) determined to be inaccessible and/or unavailable. In further additional and/or alternative instances, the indicator data can represent a file system mount instruction, wherein the agent process in response to receiving this instruction executes a file system mount operation that mounts the partial group of volumes that excludes the volume marked as being unavailable and/or inaccessible. Use of a file system mount operation can ensure that the partial group of volumes is associated with a directory that is accessible to a pod comprising the container in execution.

In certain other embodiments, system 100, interface engine 102, and/or in conjunction with an executing agent process (e.g., executing on API server equipment and/or storage server equipment), in receiving error message data representative of an inaccessibility or unavailability of a volume of a group of volumes being used by a container in execution on API server equipment, interface engine 102 can send indicator data to the agent process that is monitoring execution of the container. The indicator data can be a command of a group of commands, wherein the command when received by the agent process managing execution and/or the interactions of the container with system F!00 can facilitate the agent process to desist from mounting the volume of the group of volumes into an accessible global space.

Interface engine 102 based on the command can facilitate the mounting of a partial group of volumes to be accessible to the accessible space; the partial group of volumes does not include the volume that was deemed earlier to have been inaccessible and/or unavailable. Thereafter interface engine 102 can notify the executing agent process (and the container to which the executing agent process is monitoring) that the partial group of volumes is available in the global space.

The container can be a software collection comprising executable application programming instructions, one or more executable runtime operating system environments within which the executable application programming instructions can execute, applicable software tools, software libraries, associate licenses, and runtime parameters required for execution of the executable application programming instructions and the one or more executable runtime operating system environments.

In regard to the described containers, these can represent a standard unit of software that can package up software application code and all software code dependencies so that the software application code executes quickly and reliably regardless of computing environment. Containers are lightweight, standalone, executable software packages that include everything needed to execute the application: code instructions, runtime environment, system tools, system libraries, and appropriate settings. It should be noted that while containers and virtual machines can have similar resource isolation and/or allocation benefits, containers and virtual machines are distinct and differentiable due to the fact that containers both virtualize and/or encapsulate the operating system within the container rather than providing a virtualization of physical hardware.

Containers in addition can make application software portable so that identical or substantially similar programming code can operate on any device. A virtual machine in contrast is a digital copy of a physical machine. Virtual machines can be used for the installation of multiple operating systems and for the creation of multiple environments on a single physical machine.

Containers on the hand-to-hand package and execute applications in a predictable and repeatable way across multiple and diverse environments; instead of re-creating an environment, the application software package included in the container can be operable and executed on all types of physical machinery and/or virtually created machine environments.

A distinction between containers and virtual machines is that containers virtualize the operating system so that application instances can execute independently of the underlying hardware platform. Virtual machines in contrast virtualize the underlying physical machine in order to utilize the hardware resources efficiently.

Figure 8:
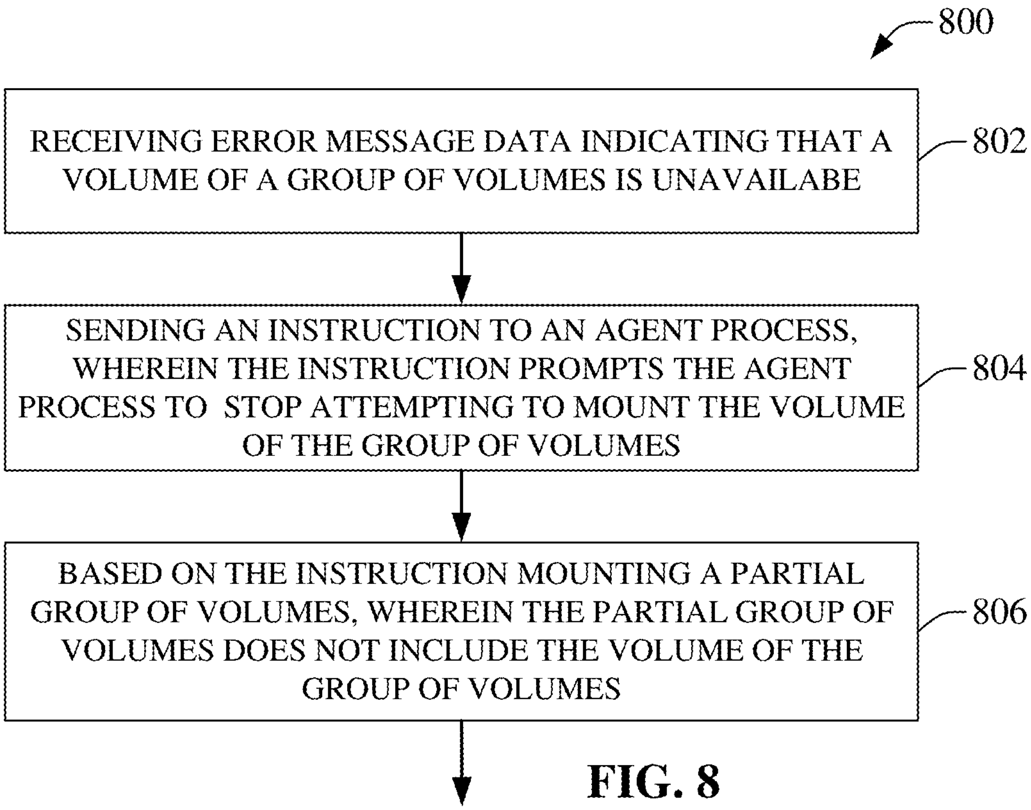
FIG. 8 illustrates a flow chart, time sequence chart, or a methodology for ignoring inaccessible volumes for software defined storage deployed in container orchestrator systems, in accordance with various non-limiting example embodiments.

FIG. 8 illustrates flowcharts, time sequences, and/or methodologies for performing operations corresponding to system 100 in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies and/or time sequences in accordance with the disclosed subject matter. In addition, those skilled in the art will understand and appreciate that the time sequences and/or methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 depicts a time-sequence diagram, method, or flow diagram 800 for ignoring inaccessible volumes for software defined storage deployed in container orchestrator systems, in accordance with various detailed implementations and/or described embodiments. Method 800 can commence, at act 802, wherein a system such as 100 can receive, as input 110, error message data that can indicate that a volume of a group of volumes has become inaccessible to a global space that can be sharable by a pod of a grouping of pods. The error message data can be received at act 802 from an agent process that can be associated with a container that can be in execution on at least processor associated with API server equipment, for example. System 100 in response to receiving the error message data can, at act 804, transmit or send to the executing agent process indicator data representing an instruction of a group of instructions, as a result of which, the executing agent process, or the associated container, cease attempting to mount the inaccessible volume of the group of volumes to the global space. Thereafter at act 806, system 100 can use the indicator data to instruct the agent process to mount a partial group of volumes to the global space, wherein the partial group of volumes does not include the inaccessible volume that has been indicated as being unavailable.

Figure 9:
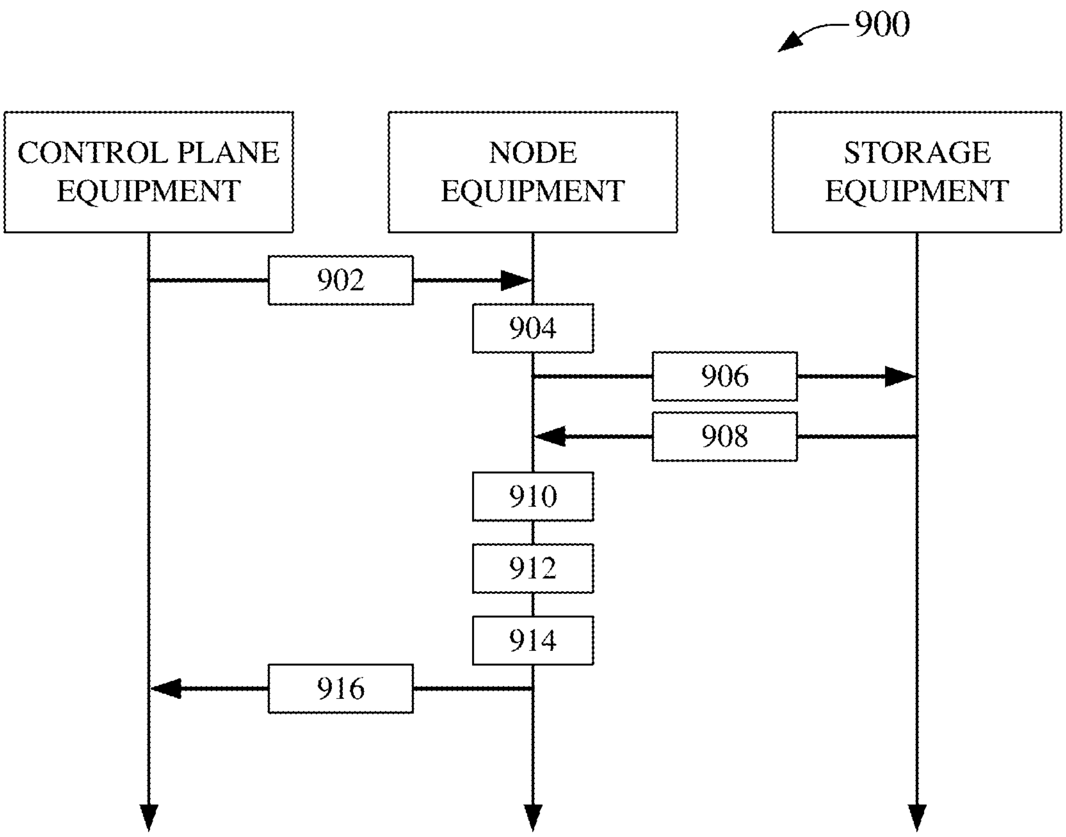
FIG. 9 depicts a time-sequence diagram, method, or flow diagram for ignoring inaccessible volumes for software defined storage deployed in container orchestrator systems, in accordance with various detailed implementations and/or described embodiments.

FIG. 9 illustrates a time-sequence diagram, method, or flow diagram 900 for ignoring inaccessible volumes for software defined storage deployed in container orchestrator systems, in accordance with various detailed implementations and/or described embodiments. Flow diagram 900 details interactions between control plane equipment (e.g., server computing class machinery/apparatuses/devices comprising processors, memories, and communications capabilities), node equipment (e.g., apparatuses comprising memories, processors, and communication facilities and/or functionalities, such as user equipment, and the like), and storage server equipment. Flow diagram 900 can commence at act 902 wherein a container agent instance operating on the node equipment can receive, from a container management instance operational on control plane equipment, an instruction to launch and execute a container. The container agent instance, at act 904, in response to receiving the instruction to initiate execution of the container can make a call to a container storage interface instance, also executing on the node equipment, to prepare a volume to be mounted for execution by the container, wherein the volume can be an external volume situated on storage server equipment. The container storage interface agent, at act 906, can request and establish a mounting of a volume associated with the requested container. In instances where the volume is unavailable and/or is inaccessible, the storage server equipment, at act 908, can respond to the container storage interface instance operating on the node equipment with a mount error message. At act 910 the container storage interface instance can forward the mount error message to the container agent instance, thereby notifying the container agent instance of the failure to mount that was received earlier from the storage server equipment. At act 912 the container agent instance executing on the node equipment can indicate to the container management instance operating on control plane equipment that there was a launch error associated with the execution of the container (e.g., the storage server equipment was unable to prepare and mount the entirety of disks comprising the volume) and as such the container cannot be started. In near contemporaneity with notifying the container management instance of the inability of the storage server equipment to prepare and mount the volume requested by the container and the failure of the container to be placed in a state of execution, the container agent instance, at act 914, can launch or initiate execution of the container without mounting the volume that was initially requested. Shortly after, at act 916, container agent instance in operation of the node equipment can report to the container management instance operational on the control plane equipment that the container has been started but with an abnormal status.

Figure 10:
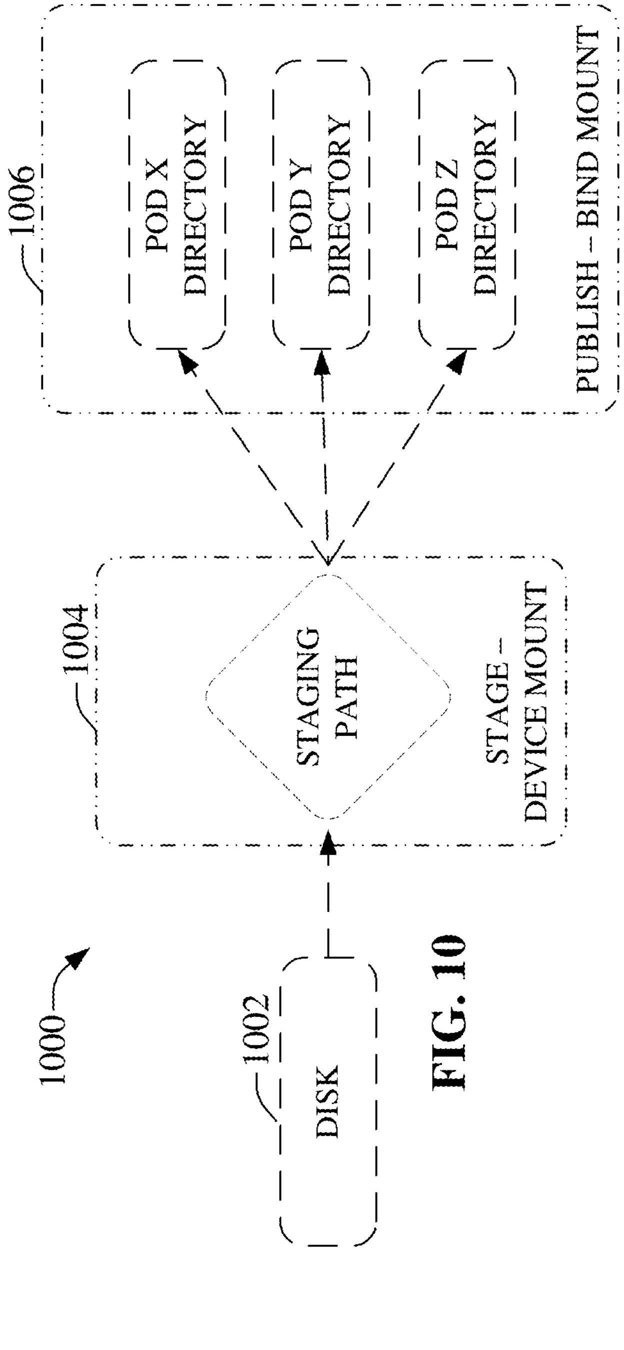
FIG. 10 presents an illustrative relationship between staging a volume (or a disk) as a global directory and publishing the global directory so that the global directory is accessible to a group of pods, in accordance with various detailed implementations and/or described embodiments.

FIG. 10 presents an illustrative relationship 1000 between staging a volume (disk or grouping of disks) as a global directory and publishing the global directory so that the global directory is accessible to a group of pods, in accordance with various detailed implementations and/or described embodiments. As depicted, in response to receiving an instruction to initiate, commence execution of, or launch a container resident in a pod or a group of pods a container agent instance operating on node equipment can make a call to a container storage interface agent instance, also operational on the node equipment, to prepare and mount a volume 1002 resident on storage server equipment (e.g., SDS equipment) on behalf of the container. The container storage interface agent instance can thereafter cause the volume to be established and staged as a global directory, illustrated as stage-device mount 1004. Should one or more disks associated with the volume to be mounted be unavailable and/or inaccessible, a mount error can be issued by the storage server equipment and directed to the container storage interface agent instance. The container interface agent instance can forward the mount error issued by the storage server equipment to the container agent instance. At this juncture the container agent instance can report to a container management agent instance executing on control plane equipment that the container has failed to launch and/or commence execution on the node equipment. In addition to reporting, to the container management agent instance, that the container has failed to launch and/or commence execution, the container agent instance can also direct the container to launch and commence executing on the node equipment, albeit without access to the entirety of volume (e.g., a partial volume without the inaccessible or unavailable disks will be made accessible to the container and the pod of a group of pods within which the container belongs) by publishing the partial volume for access and use by the group of pods as well as the container in execution, as illustrated as publish-bind mound 1006. Once the partial volume has been published, the container agent instance can report to the container management agent instance that the container has commenced execution but with an abnormal status.

Figure 11:
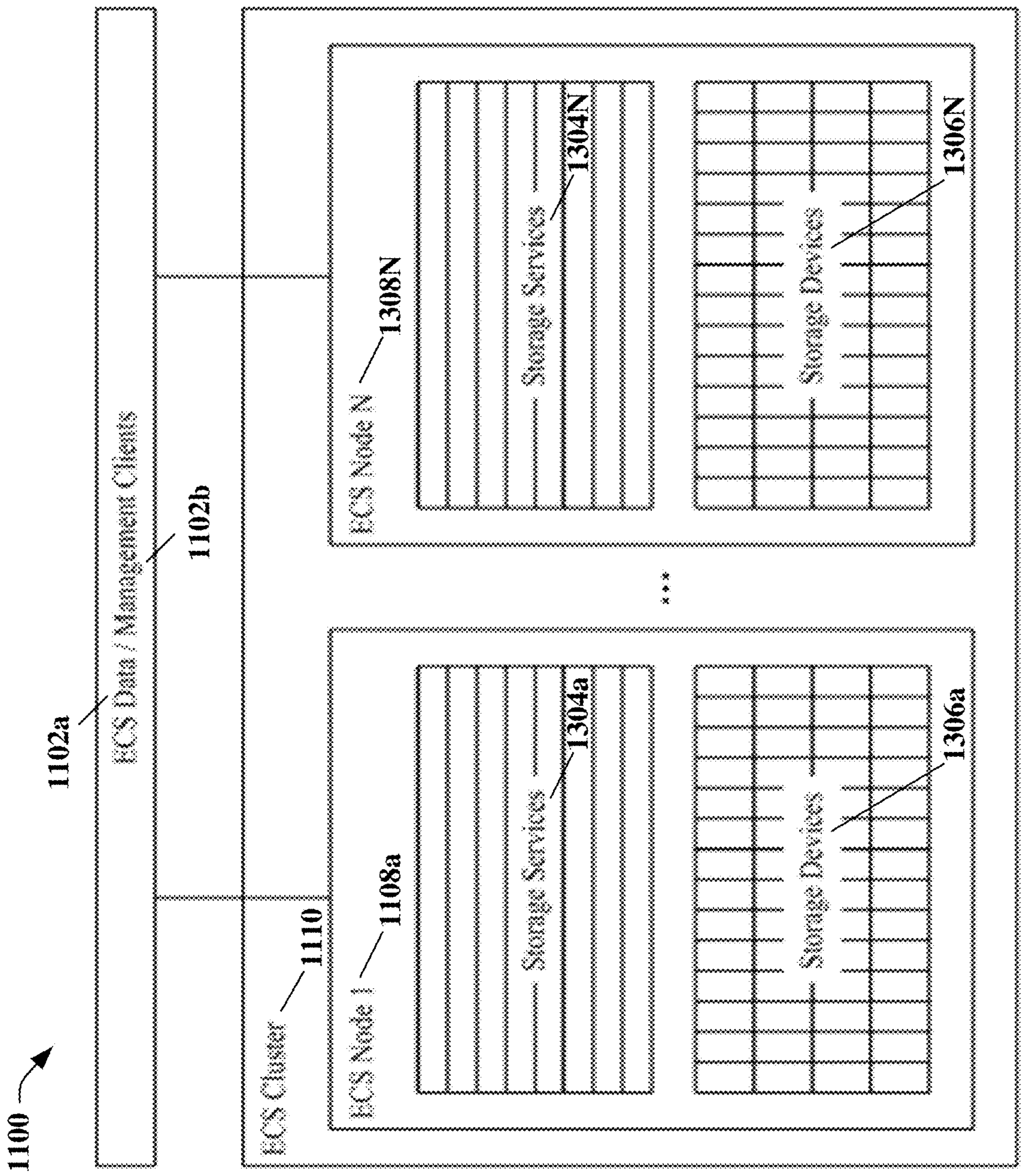
FIG. 11 illustrates an elastic cloud storage (ECS) system, in accordance with various non-limiting example embodiments.

In the following, FIG. 11 describes an example non-limiting cloud storage system in the non-limiting context of an ECS storage system, but for the avoidance of doubt, the subject embodiments can apply to any storage platform. For instance, in this regard, FIG. 11 illustrates an ECS storage system 1100 comprising a cloud-based object storage appliance in which corresponding storage control software comprising, e.g., ECS data client(s) 1102_a_, ECS management client(s) 1102_b_, storage service(s) 1104_a_ . . . 1104N, etc. and storage devices 1106a . . . 1106N (e.g., storage media, such as physical magnetic disk media, etc. of respective ECS nodes of ECS cluster 1110) are combined as an integrated system with no access to the storage media other than through the ECS storage system 1100.

In this regard, ECS cluster 1110 comprises multiple nodes 1108a . . . 1108N, storage nodes, ECS nodes, etc. Each node is associated with storage devices 1106a . . . 1106N, e.g., hard drives, physical disk drives, storage media, etc. In embodiment(s), ECS node 1108a, or any ECS node, executing on a hardware appliance can be communicatively coupled, connected, cabled to, etc., e.g., 15 to 120 storage devices. Further, each ECS node can execute one or more services for performing data storage operations described herein.

For instance, the ECS storage system 1100 can be an append-only virtual storage platform that protects content from being erased or overwritten for a specified retention period. In particular, the ECS storage system 1100 does not employ traditional data protection schemes like mirroring or parity protection. Instead, the ECS storage system 1100 utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS storage system 1100 can support storage, manipulation, and/or analysis of unstructured data on a massive scale on commodity hardware. As an example, the ECS storage system 1100 can support mobile, cloud, big data, and/or social networking applications. In another example, the ECS storage system 1100 can be deployed as a turnkey storage appliance, or as a software product that can be installed on a set of qualified commodity servers and disks, e.g., within a node, data storage node, etc. of a cluster, data storage cluster, etc. In this regard, the ECS storage system 1100 can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word-without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, x=(x1, x2, x3, x4, . . . , xn), to a confidence that the input belongs to a class, that is, f (x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by interface engine 102.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1222, disk storage 1224, and/or memory storage 1246, further description of which is below. For instance, nonvolatile memory can be included in read only memory (ROM), programmable ROM (PROM), electrically programmable ROM (EPROM), electrically erasable ROM (EEPROM), or flash memory. Volatile memory 1220 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
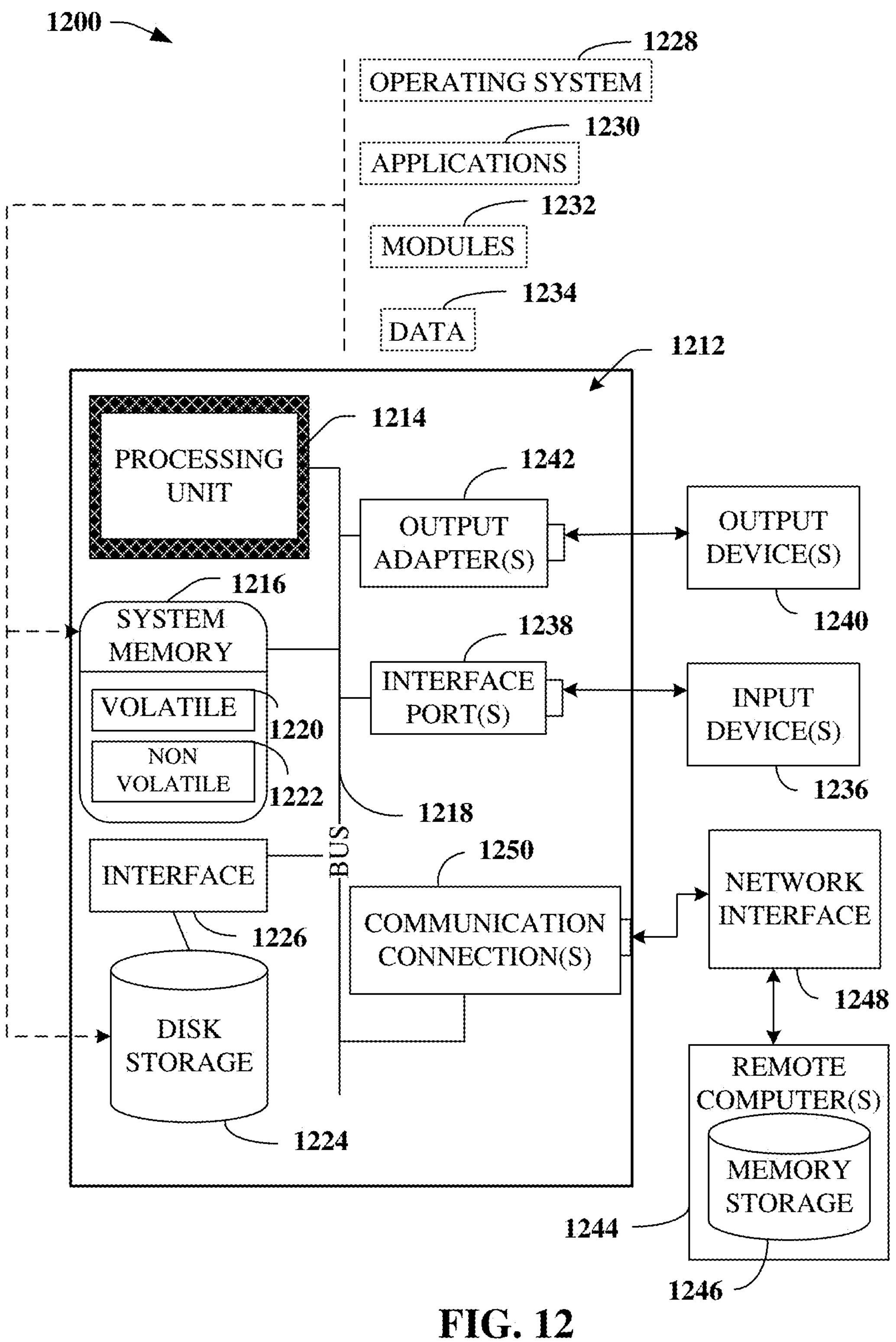
FIG. 12 illustrates a block diagram representing an illustrative non-limiting computing system or operating environment in which one or more aspects of various non-limiting embodiments described herein can be implemented.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 12, a block diagram of a computing system 1200, e.g., system 100, operable to execute the disclosed systems and methods is illustrated, in accordance with an embodiment. Computer 1212 comprises a processing unit 1214, a system memory 1216, and a system bus 1218. System bus 1218 couples system components comprising, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1216 comprises volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can comprise ROM, PROM, EPROM, EEPROM, or flash memory. Volatile memory 1220 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also comprises removable/non-removable, volatile/non-volatile computer storage media. FIG. 12 illustrates, for example, disk storage 1224. Disk storage 1224 comprises, but is not limited to, devices like a magnetic disk drive, floppy disk drive, tape drive, Jaz drive, Zip drive, LS-100 drive, flash memory card, or memory stick. In addition, disk storage 1224 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software comprises an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information into computer 1212 through input device(s) 1236. Input devices 1236 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1214 through system bus 1218 via interface port(s) 1238. Interface port(s) 1238 comprise, for example, a serial port, a parallel port, a game port, a universal serial bus (USB), a wireless based port, e.g., Wi-Fi, Bluetooth, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240, like display devices, light projection devices, monitors, speakers, and printers, among other output devices 1240, which use special adapters. Output adapters 1242 comprise, by way of illustration and not limitation, video and sound devices, cards, etc. that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically comprises many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically and/or wirelessly connected via communication connection 1250. Network interface 1248 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can comprise, for example, internal and external technologies such as modems, comprising regular telephone grade modems, cable modems and DSL modems, wireless modems, ISDN adapters, and Ethernet cards.

The computer 1212 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1212 can connect to other devices/networks by way of antenna, port, network interface adaptor, wireless access point, modem, and/or the like.

The computer 1212 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

receiving, from an agent process associated with a container being executed by the at least one processor, error message data representative of an unavailability of a volume of a group of volumes to be accessible to a global space that is sharable by a pod of pods;

in response to the error message data, sending, to the agent process, indicator data representing a first instruction of a group of instructions, as a result of which the agent process ceases attempting to mount the volume of the group of volumes to the global space; and using a second instruction of the group of instructions, mounting a partial group of volumes to the global space, wherein the partial group of volumes excludes the volume that is unavailable.

2. The system of claim 1, wherein the pod of pods comprises a group of containers that share the global space.

3. The system of claim 1, wherein the container represents a self-sufficient, self-contained software package comprising executable software application code, executable runtime environment and associated system tools, system libraries, and parameters used to execute the executable software application code.

4. The system of claim 3, wherein the container is independently operable in diverse and multiple operating system environments and is executable on disparate computing hardware other than the system.

5. The system of claim 3, wherein the container virtualizes a first operating system in order to execute an application instance independently of a second operating system operating on computing hardware.

6. The system of claim 1, wherein sending the first instruction to the agent process causes a failure of the group of volumes to be mounted to the global space.

7. The system of claim 1, wherein sending the second instruction to the agent process permits the partial group of volumes to be mounted to the global space and be accessible to the pod of pods.

8. The system of claim 1, wherein sending a third instruction to the agent process causes the partial group of volumes to be mounted to a directory accessible to the container.

9. A method, comprising:

in response to receiving, by storage server equipment comprising one or more processors, error message data representative of an unavailability of a volume of a group of volumes being used by a container in execution via application server equipment, sending indicator data to an agent process that is monitoring execution of the container via the application server equipment, wherein the indicator data represents a first actionable prompt of a collection of application prompts, and wherein in response to receiving the actionable prompt the agent process omits mounting of the volume of the group of volumes to an accessible global space;

based on a second actionable prompt, mounting, by the storage server equipment, a partial group of volumes to the accessible global space, wherein the partial group of volumes excludes the volume that is unavailable; and notifying the agent process that the partial group of volumes is available in the accessible global space.

10. The method of claim 9, wherein the accessible global space is shared by a pod of pods, wherein each pod comprises groups of disparate containers, and wherein the container is included in the pod of pods.

11. The method of claim 9, wherein the storage server equipment operates using object storage software that is a virtualization that separates physical storage hardware from the object storage software that manages the physical storage hardware.

12. The method of claim 9, wherein the container is a self-contained software bundle comprising machine executable application programming instructions, an executable runtime operating system environment, applicable software tools, software libraries, and runtime parameters necessary for execution of the machine executable application programming instructions.

13. The method of claim 9, wherein the indicator data represents a default instruction, and wherein, responsive to the unavailability of the volume and execution of the default instruction, the group of volumes is caused to become inaccessible in the accessible global space.

14. The method of claim 9, wherein the indicator data represents a bind mount instruction, and wherein, responsive to the unavailability of the volume and execution of the bind mount instruction, the partial group of volumes is permitted to be accessible in the accessible global space.

15. The method of claim 9, wherein the indicator data represents a file system mount instruction, and wherein, responsive to the unavailability of the volume and execution of the file system mount instruction, the partial group of volumes is caused to become associated with a directory accessible to a pod comprising the container.

16. A non-transitory machine-readable medium comprising instructions that, in response to execution, cause a system comprising at least one processor to perform operations, comprising:

in response to receiving error message data representative of an inaccessibility of a volume of a group of volumes being used by a container in execution on application server equipment, sending indicator data to an agent process that is monitoring execution of the container on the application server equipment, wherein the indicator data represents a first command of a collection of commands that orders the agent process to desist from mounting the volume of the group of volumes to an accessible global space;

based on a second command of the collection of commands, mounting a partial group of volumes to the accessible global space, wherein the partial group of volumes excludes the volume that is inaccessible; and notifying the agent process that the partial group of volumes is available in the accessible global space.

17. The non-transitory machine-readable medium of claim 16, wherein the container is a software collection comprising executable application programming instructions, an executable runtime operating system environment within which the executable programming instructions can execute, applicable software tools, software libraries, and runtime parameters required for execution of the executable application programming instructions and the executable operating system environment.

18. The non-transitory machine-readable medium of claim 16, wherein the indicator data represents the first command that, in response to the first command being executed, the agent process based on the unavailability of the volume, causes the group of volumes to be inaccessible in the accessible global space.

19. The non-transitory machine-readable medium of claim 16, wherein the indicator data represents the second command, in response to the second command being executed, the agent process based on the unavailability of the volume, permits the partial group of volume to be accessible in the accessible global space.

20. The non-transitory machine-readable medium of claim 16, wherein the indicator data represents a third command that, in response to the third command being executed, the agent process based on the unavailability of the volume, causes the partial group of volumes to be associated with a directory accessible to the container included in a pod of pods.

* * * * *